US009541954B1

(12) United States Patent
Lee et al.

(10) Patent No.: US 9,541,954 B1
(45) Date of Patent: Jan. 10, 2017

(54) PORTABLE ELECTRONIC DEVICE

(71) Applicant: Acer Incorporated, New Taipei (TW)

(72) Inventors: Po-Yi Lee, New Taipei (TW); Yi-Chang Yeh, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/938,847

(22) Filed: Nov. 12, 2015

(30) Foreign Application Priority Data

Aug. 14, 2015 (TW) .............................. 104126515 A

(51) Int. Cl.
*G06F 1/16* (2006.01)
(52) U.S. Cl.
CPC .................... *G06F 1/1618* (2013.01)
(58) Field of Classification Search
CPC ................ G06F 1/1618; G06F 1/162
See application file for complete search history.

(56) References Cited

U.S. PATENT DOCUMENTS

| 8,705,229 | B2 * | 4/2014 | Ashcraft | ............... | G06F 1/1679 |
| | | | | | 312/223.1 |
| 9,161,469 | B2 * | 10/2015 | Han | .................. | H05K 7/00 |
| 2007/0133156 | A1 * | 6/2007 | Ligtenberg | ............ | G06F 1/1616 |
| | | | | | 361/679.27 |
| 2009/0103261 | A1 * | 4/2009 | Shih | .................. | E05C 19/16 |
| | | | | | 361/679.58 |
| 2016/0275648 | A1 * | 9/2016 | Honda | ................... | G06T 3/60 |

FOREIGN PATENT DOCUMENTS

| CN | 101730423 | 6/2010 |
| CN | 104375571 | 2/2015 |
| TW | 201015944 | 4/2010 |

* cited by examiner

*Primary Examiner* — Anthony Q Edwards
(74) *Attorney, Agent, or Firm* — Jianq Chyun IP Office

(57) ABSTRACT

A portable electronic device includes first and second bodies. The first body includes a guiding rail, a restoring component, a first magnet disposed in the guiding rail, top and bottom surfaces. The guiding rail is connected between the top and bottom surfaces. The restoring component is disposed at one end of the guiding rail close to the top surface. The second body including a second magnet is pivotally connected to the first body for rotating from leaning on the top surface till leaning on the bottom surface. When the second body leans on the top surface, the first magnet is attracted to the second magnet to lean on the restoring component. When the second body leans on the bottom surface, an attraction force between the first and second magnets is greater than a restoring force provided by the restoring component so the second magnet moves toward the bottom surface.

10 Claims, 3 Drawing Sheets

PORTABLE ELECTRONIC DEVICE

CROSS-REFERENCE TO RELATED APPLICATION

This application claims the priority benefit of Taiwan application serial no. 104126515, filed on Aug. 14, 2015. The entirety of the above-mentioned patent application is hereby incorporated by reference herein and made a part of this specification.

BACKGROUND OF THE INVENTION

Field of the Invention

The invention relates to an electronic device, and specifically relates to a portable electronic device.

Description of Related Art

As the technology industries develop in recent years, portable electronic devices, such as notebook (NB), tablet PC, and smart phone, etc., are used frequently in our daily life. Types and functions of the electronic devices are increasingly diversified, and the electronic devices are more popular due to convenience and practicality thereof and can be used for different purposes according to requirements of the user.

Taking a notebook computer as an example, the electronic device may have a top body and a bottom body, and the top and bottom bodies are pivotally connected to each other via the rotating assembly. Therefore, the top body can rotate relatively to the bottom body via the rotating assembly so as to unfold and to expose the display located on the top body. However, this type of the electronic device has only one operating mode even through the rotating angle between the top body and the bottom body can be adjusted according to requirements.

Therefore, there are some techniques to make the top body rotate 360 degrees relatively to the bottom body, so the top body may rotate from a closing state till the top body is stacked on the bottom surface of the bottom body to be used as a tablet PC. Moreover, in order to fix the relative position between the top body and the bottom body in the closing state and the tablet state, a plurality of magnets are usually disposed in the top body and the bottom body, so as to make the top body attract the top surface of the bottom body in the closing state, and to make the top body attract the bottom surface of the bottom body in the tablet state. However, the components in the above-mentioned device is relatively complicated and many magnets need to be used. In addition, in order to achieve a sufficient attraction force, the size of the magnet is increased accordingly and thus the price is also relatively expensive, so that the size of the portable electronic device cannot be effectively reduced and the cost of production of the portable electronic device is also increased.

SUMMARY OF THE INVENTION

The invention provides a portable electronic device which is lighter in weight, thinner in overall size, and lower in cost of production.

A portable electronic device of the invention includes a first body and a second body. The first body includes a guiding rail, a restoring component, a first magnet, a top surface, and a bottom surface opposite to the top surface. The guiding rail is disposed in the first body and connected between the top surface and the bottom surface. The first magnet is disposed in and moved along the guiding rail. The restoring component is disposed at one end of the guiding rail close to the top surface. The second body is pivotally connected to the first body, and includes a second magnet which is disposed in the second body. The second body is configured to lean on the top surface and to rotate relatively to the first body till leaning on the bottom surface. When the second body leans on the top surface, the first magnet is attracted to the second magnet to lean on the restoring component. When the second body leans on the bottom surface, an attraction force between the first magnet and the second magnet is greater than a restoring force provided by the restoring component so the first magnet moves away from the restoring component to move toward the bottom surface.

Based on the above, the portable electronic device of the invention utilizes the disposition of the guiding rail and the restoring component, so that the first magnet of the first body can move in the guiding rail, and the distance from an initial position of the first magnet to the position of second magnet can be shortened by disposing the restoring component. Therefore, only one magnet is needed to be disposed in each of the first body and the second body for the first body and the second body to be attracted to each other when the portable electronic device is in the closing state and the tablet state. Therefore, the number of magnets used in the portable electronic device 100 is indeed reduced, so the cost of production is decreased, and the size of the magnet can be further reduced, so as to make the portable electronic device 100 lighter in weight and thinner in overall size.

In order to make the aforementioned and other features and advantages of the invention more comprehensible, embodiments accompanying figures are described in detail below.

DESCRIPTION OF THE EMBODIMENTS

Figure 1:
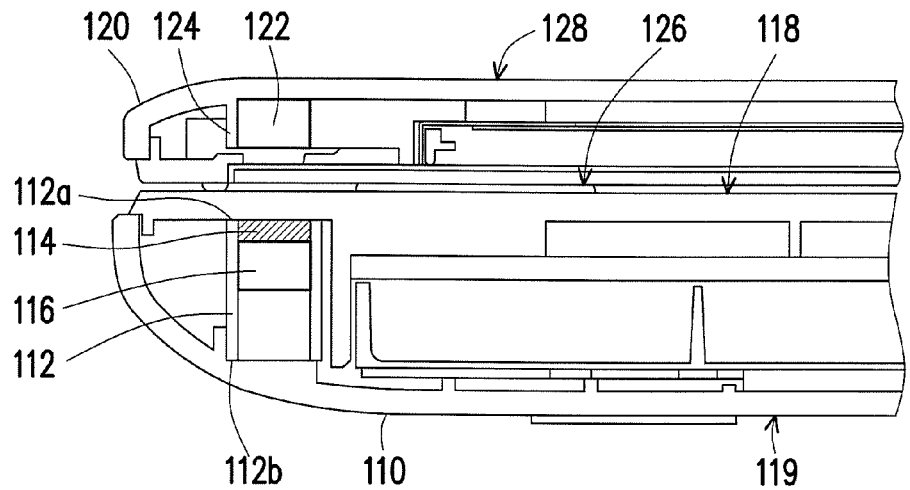
FIG. 1 is a partial cross-sectional view of a portable electronic device in a closing state according to one embodiment of the invention.

In the following detailed description of the preferred embodiment, reference is made to the accompanying drawings which form a part hereof, and in which are shown by way of illustration specific embodiment in which the invention may be practiced. In this regard, the directional terminologies, such as "top", "bottom", "left", "right", "front", or "back", etc., are used with reference to the orientation of the Figure(s) being described. Accordingly, the drawings and descriptions will be regarded as illustrative in nature and not as restrictive. In the following embodiments, the same reference numbers are used in the drawings and the description to refer to the same or similar elements.

Figure 2:
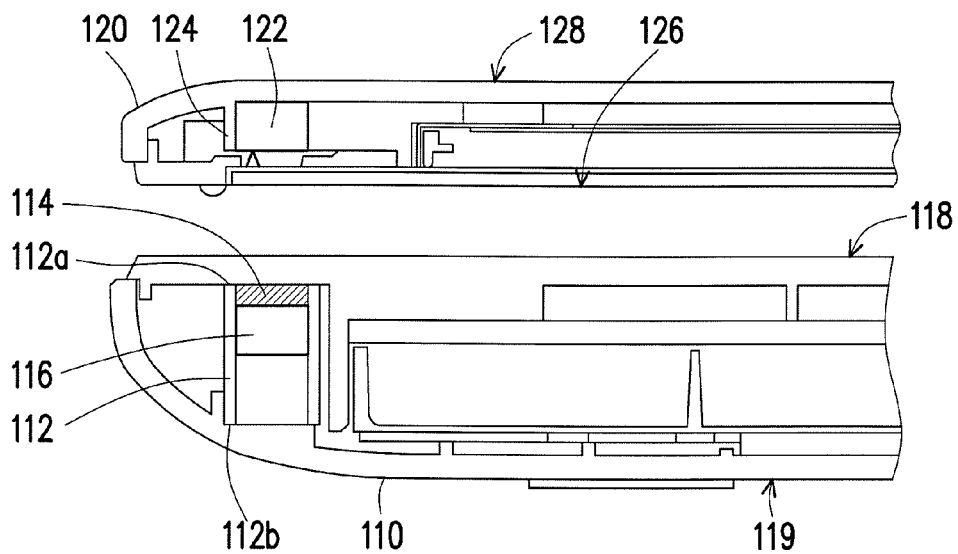
FIG. 2 is a partial cross-sectional view of the portable electronic device of FIG. 1 in an opening state.
Figure 3:
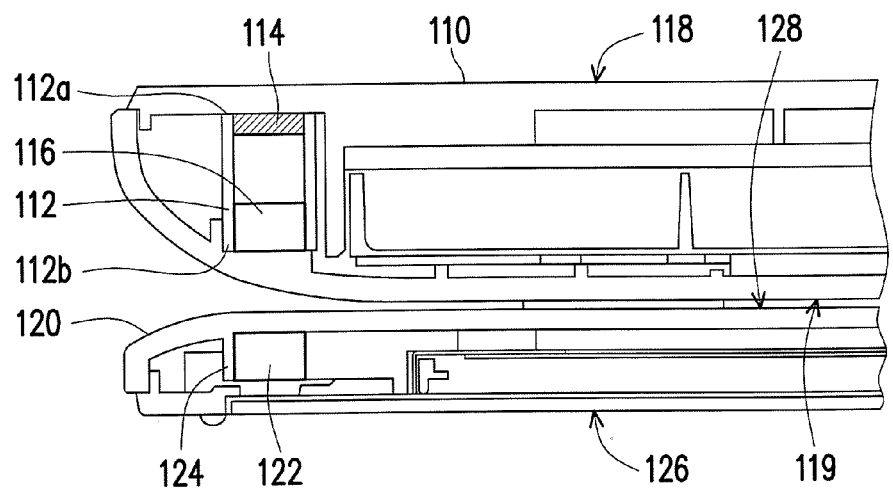
FIG. 3 is a partial cross-sectional view of the portable electronic device of FIG. 1 in a tablet state.

FIG. 1 is a partial cross-sectional view of a portable electronic device in a closing state according to one embodiment of the invention. FIG. 2 is a partial cross-sectional view of the portable electronic device of FIG. 1 in an opening state. FIG. 3 is a partial cross-sectional view of the portable electronic device of FIG. 1 in a tablet state. Referring to FIG. 1 to FIG. 3, in the present embodiment, a portable electronic device 100 includes a first body 110, and a second body 120. The second body 120 can be pivotally connected to the first body 110 to rotate relatively to the first body 110. Specifically, the portable electronic device 100 can be a notebook computer, the first body 110 may include a top surface 118 and a bottom surface 119 opposite to the top surface 118, and the second body 120 may include, for example, a display surface 126 and an external surface 128 opposite each other. Specifically, the first body 110 may include a keyboard module which is disposed on the top surface 118 of the first body 110, and the second body 120 can include a display panel or a touch display panel which is disposed on the display surface 126 of the second body 120. However, the above descriptions are provided as an example only, which should not be construed as a limitation to the invention.

To be more specific, the portable electronic device 100 can include a pivot shaft to connect the first body 110 with the second body 120 pivotally, so that the second body 120 is configured to rotate 360 degrees relatively to the first body 110, so as to make the second body 120 rotate between a closing state as shown in FIG. 1 and a tablet state as shown in FIG. 3. When the portable electronic device 100 is in the closing state, the display surface 126 of the portable electronic device 100 leans on the top surface 118 of the first body 110 as shown in FIG. 1. When the second body 120 rotates relatively to the first body 110 to the tablet state of the portable electronic device 100 as shown in FIG. 3, the external surface 128 of the second body 120 leans on the bottom surface 119 of first body 110. At this time, the display surface 126 of the second body 120 is exposed to the outside so that it is convenient for the user to use the portable electronic device 100 as a tablet PC. It is noted that the present embodiment is used as an illustrating example, in other embodiments, the second body 120 can also be a tablet PC, and the first body 110 can be a docking station of the tablet PC, the second body 120 can detachably and pivotally connected to the first body 110 and can rotate relatively to the first body 110. The types of the portable electronic device are not limited in the invention.

Specifically, the first body 110 may include a guiding rail 112, a restoring component 114, a first magnet 116, a top surface 118, and a bottom surface 119 opposite to the top surface 118 as shown in FIG. 1. The guiding rail 112 is disposed in the first body 110 and connected between the top surface 118 and the bottom surface 119. The first magnet 116 is disposed in the guiding rail 112 to be moved along the guiding rail 112. The restoring component 114 is disposed at an end of the guiding rail 112 close to the top surface 118. To be more specific, the guiding rail 112 includes a first end 112a close to the top surface 118 and a second end 112b close to the bottom surface 119, the restoring component 114 is disposed at the first end 112a of the guiding rail 112. The second body 120 is pivotally connected to the first body 110, and includes a second magnet 122 which is disposed in the second body 120. The polarities of the first magnet 116 and the second magnet 122 are opposite to each other, in other words, the first magnet 116 and the second magnet 122 attract each other.

In the present embodiment, the restoring component 114 is a metal block which is disposed at the first end 112a of the guiding rail 112. The second body 120 is configured to lean on the top surface 118 of the first body 110 and to rotate relatively to the first body 110 till leaning on the bottom surface 119 of the first body 110. When the second body 120 leans on the top surface 118 of the first body 110 as shown in FIG. 1, the first magnet 116 of the first body 110 is attracted toward the top surface 118 by the restoring component 114 and the second magnet 122 so as to lean on the metal block 114. At this time, the top surface 118 of the first body 110 and the display surface 126 of the second body 120 attract each other to maintain the closing state as shown in FIG. 1.

As such, when the user wants to use the portable electronic device 100, the user only needs to resist the attraction force between the first magnet 116 and the second magnet 122 to lift the second body 120 up as shown in FIG. 2 and to make the second body 120 rotate to an appropriate angle relative to the first body 110. Therefore, the user can use both the display device of the second body 120 and the keyboard module of the first body 110. At this time, the first magnet 116 still leans on the metal block 114 because of the attraction force existing between the first magnet 116 and the metal block 114.

Accordingly, the user may keep rotating the second body 120 till the second body 120 is in the tablet state as shown in FIG. 3, the second body 120 leans on the bottom surface 119 of first body 110, so that the portable electronic device 100 is used as a tablet PC. At this time, the attraction force between the first magnet 116 and the second magnet 122 is greater than the restoring force provided by the restoring component 114 so the first magnet 116 moves away from the restoring component 114 to move toward the bottom surface 119 and. The restoring force described above is an attraction force between the first magnet 116 and the metal block 114. In other words, when the second body 120 leans on the bottom surface 119 of the first body 110, the attraction force between the second magnet 122 of the second body 120 and the first magnet 116 of the first body 110 is greater than the attraction force between the first magnet 116 and the metal block 114, so that the first magnet 116 is attracted by the second magnet 122 of the second body 120 to move toward the bottom surface 119. At this time, the bottom surface 119 of the first body 110 and the external surface 128 of the second body 120 attract each other by the attraction force, so as to fix the relative position of the first body 110 and the second body 120 to maintain the tablet state as shown in FIG. 3.

Moreover, in the present embodiment, the second body 120 may further include a guiding slot 124 which is disposed in the second body 120 and connected between the display surface 126 and the external surface 128, the second magnet 122 is disposed in the guiding slot 124, and the second magnet 122 may also move along the guiding slot 124 when the portable electronic device 100 is in the closing state or the tablet state.

With this disposition described above, when the portable electronic device 100 is in the closing state, the first magnet 116 is attracted to the metal block 114 disposed at the first end 112a of the guiding rail 112, so the first magnet 116 moves toward the top surface 118 to leans on the metal block 114, such that the first magnet 116 is easily attracted to the second magnet 122, so as to fix the relative position between the first body 110 and the second body 120 to maintain the closing state. When the portable electronic device 100 is in the tablet state, the second body 120 leans on the bottom surface 119 of the first body 110, at this time, since the first magnet 116 leans on the metal block 114 initially, the distance between the first magnet 116 and the second magnet 120 is shortened, which allows the first magnet 116 to be attracted to the second body 120, so the first magnet 116 moves toward the bottom surface 119. At this time, the bottom surface 119 of the first body 110 and the external surface 128 of the second body 120 attract each other because of the attraction force so as to fix the relative position of the first body 110 and the second body 120 to maintain the tablet state.

Figure 4:
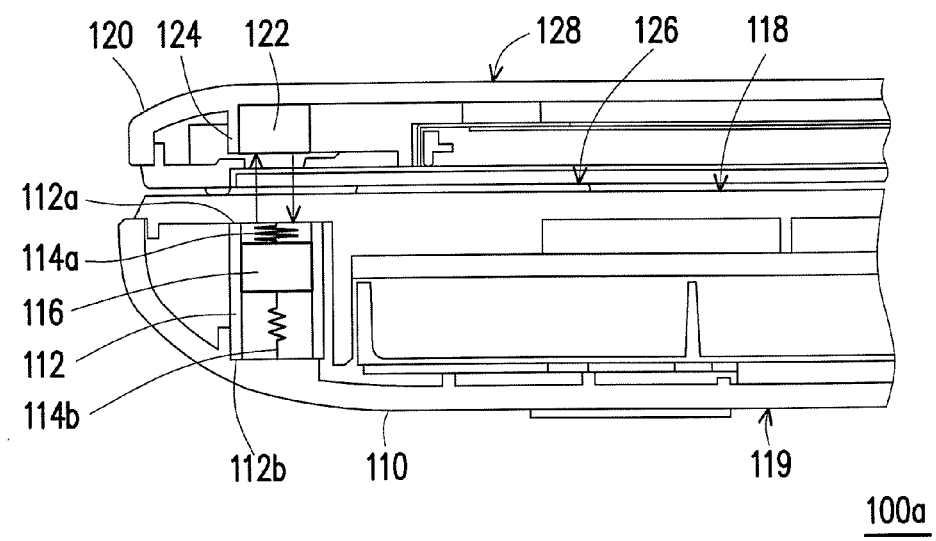
FIG. 4 is a partial cross-sectional view of a portable electronic device in the closing state according to another embodiment of the invention.
Figure 5:
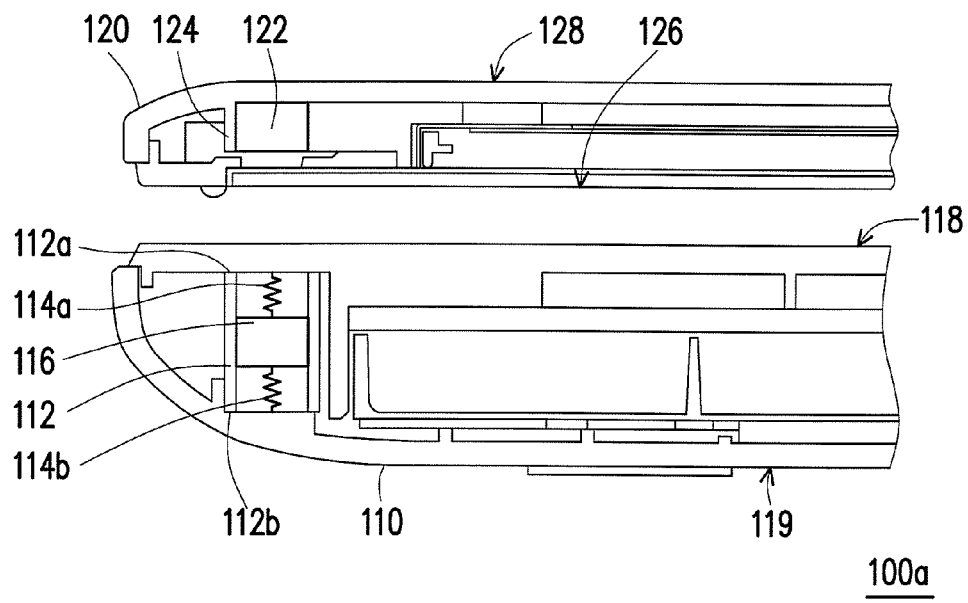
FIG. 5 is a partial cross-sectional view of the portable electronic device of FIG. 4 in the opening state.
Figure 6:
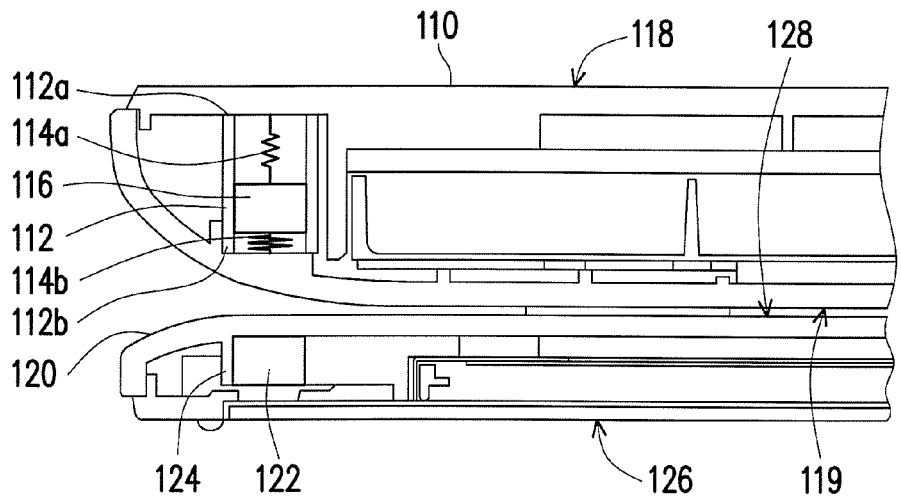
FIG. 6 is a partial cross-sectional view of the portable electronic device of FIG. 4 in the tablet state.

Therefore, the disposition of the restoring component 114 is adopted to shorten the distance between the first magnet 116 and the second magnet 122 in the present embodiment, so the first body 110 and the second body 120 can attract each other in both the closing state and the tablet state by disposing only one magnet in each of the first body 110 and the second body 120. Therefore, the number of magnets used in the portable electronic device 100 is indeed reduced, so the cost of production is decreased, and the size of the magnet can be further reduced, so as to make the portable electronic device 100 lighter in weight and thinner in overall size FIG. 4 is a partial cross-sectional view of a portable electronic device in the closing state according to another embodiment of the invention. FIG. 5 is a partial cross-sectional view of the portable electronic device of FIG. 4 in the opening state. FIG. 6 is a partial cross-sectional view of the portable electronic device of FIG. 4 in the tablet state. It should be noted here, the portable electronic device 100 in the FIG. 4 to FIG. 6 is similar to the portable electronic device 100 in the FIG. 1 to FIG. 3. Therefore, the present embodiment utilizes the same labels and partial contents of the above embodiment, wherein the same labels are adopted to represent same or similar elements and the description of similar technical content is omitted. Regarding the details of the omitted parts reference to the previous embodiment can be made, and will not be repeated in the present embodiment. Referring to FIG. 4 to FIG. 6 simultaneously, only the differences between the portable electronic device 100a of the present embodiment and the portable electronic device 100 in FIG. 1 to FIG. 3 are described as following.

In the present embodiment, the restoring component 114 includes a first elastic member 114a which is disposed at the first end 112a of the guiding rail 112 and connected to the first magnet 116. In addition, the portable electronic device 100 of the invention further includes a second elastic member 114b which is disposed at the second end 112b of the guiding rail 112 and connected to the first magnet 116. In other words, the first elastic member 114a and the second elastic member 114b are respectively connected to two opposite ends 112a, 112b of the guiding rail 112, and are both connected to the first magnet 116. With this disposition, in an initial state, the first magnet 116 is subject to the elastic forces provided by both the first elastic member 114a and the second elastic member 114b so as to be located in the middle of the guiding rail 112. In addition, the attraction force between the first magnet 116 of the first body 110 and the second magnet 122 of the second body 120 is greater than the elastic force provided by the first elastic member 114a and the second elastic member 114b.

With this configuration, when the second body 120 leans on the top surface 118 of the first body 110 as shown in FIG. 4, since the first magnet 116 is located in the middle of the guiding rail 112, the distance from the first magnet 116 to the second magnet 122 of the second body 120 is short enough for the first magnet 116 to be attracted to the second magnet 122 and to resist the first elastic force generated by compressing the first elastic member 114a, such that the first magnet 116 moves toward the top surface 118 to lean against first elastic member 114a as shown in FIG. 4. At this time, the top surface 118 of the first body 110 and the display surface 126 of the second body 120 attract each other to maintain the closing state as shown in FIG. 4.

As such, when the user wants to use the portable electronic device 100, the user only needs to resist the attraction force between the first magnet 116 and the second magnet 122 to lift the second body 120 up as shown in FIG. 5 and make the second body 120 rotate to an appropriate angle relative to the first body 110, such that the user can use both the display device of the second body 120 and the keyboard module of the first body 110. At this time, since the first magnet 116 is not attracted to the second magnet 122, the first magnet 116 is restored to the middle of the guiding rail 122 as shown in FIG. 5.

Moreover, the user may keep rotating the second body 120 relatively to the first body 110 to the tablet state as shown in FIG. 6, the second body 120 leans on the bottom surface 119 of first body 110, so that the portable electronic device 100 is used as a tablet PC. At this time, the attraction force between the first magnet 116 and the second magnet 122 is greater than the restoring force provided by the restoring component 114 so the first magnet 116 moves away from the restoring component 114 to move toward the bottom surface 119. Herein, the restoring force described above is the first elastic force which is generated by stretching the first elastic member 114a and the second elastic force is generated by compressing the second elastic member 114b. In other words, when the second body 120 leans on the bottom surface 119 of the first body 110, since the first magnet 116 is initially located in the middle of the guiding rail 112, the distance from the first magnet 116 to the second magnet 122 of the second body 120 is short enough for the first magnet 116 to be attracted to the second magnet 122, and the attraction force is strong enough to resist the first elastic force and the restoring force provided by the second elastic member 114b so as to make the first magnet 116 attracted to the second magnet 122 of the second body 120 to move toward the bottom surface 119. At this time, the bottom surface 119 of the first body 110 and the external surface 128 of the second body 120 attract each other because of the attraction force so as to fix the relative position of the first body 110 and the second body 120 to maintain the tablet state as shown in FIG. 6.

In summary, the portable electronic device of the invention utilizes the disposition of the guiding rail and the restoring component, so that the first magnet of the first body can move in the guiding rail, and the distance from an initial position of the first magnet to the position of second magnet can be shortened by disposing the restoring component. Therefore, only one magnet is needed to be disposed in each of the first body and the second body for the first body and the second body to be attracted to each other when the portable electronic device is in the closing state and the tablet state. Therefore, the number of magnets used in the portable electronic device 100 is indeed reduced, so the cost of production is decreased, and the size of the magnet can be further reduced, so as to make the portable electronic device 100 lighter in weight and thinner in overall size.

Although the present invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A portable electronic device, comprising:
a first body, comprising a guiding rail, a restoring component, a first magnet, a top surface, and a bottom surface opposite to the top surface, wherein the guiding rail is disposed in the first body and connected between the top surface and the bottom surface, the first magnet is disposed in the guiding rail to be moved along the guiding rail, and the restoring component is disposed at an end of the guiding rail close to the top surface; and
a second body, pivotally connected to the first body and comprising a second magnet disposed in the second body, wherein the second body is configured to lean on the top surface and rotate relatively to the first body till leaning on the bottom surface, when the second body leans on the top surface, the first magnet is attracted to the second magnet to lean on the restoring component, when the second body leans on the bottom surface, an attraction force between the first magnet and the second magnet is greater than a restoring force provided by the restoring component so the first magnet moves away from the restoring component to move toward the bottom surface.

2. The portable electronic device as recited in claim 1, wherein the restoring component is a metal block.

3. The portable electronic device as recited in claim 2, wherein the restoring force is an attraction force between the first magnet and the metal block.

4. The portable electronic device as recited in claim 1, wherein the guiding rail comprises a first end close to the top surface and a second end close to the bottom surface, and the restoring component is disposed at the first end.

5. The portable electronic device as recited in claim 4, wherein the restoring component comprises a first elastic member disposed at the first end and connected to the first magnet, the restoring force is a first elastic force generated by stretching the first elastic member.

6. The portable electronic device as recited in claim 5, further comprising a second elastic member disposed at the second end and connected to the first magnet.

7. The portable electronic device as recited in claim 6, wherein the attraction force is greater than a second elastic force generated by compressing the second elastic member, such that the first magnet compresses the second elastic member to move toward the bottom surface.

8. The portable electronic device as recited in claim 1, wherein the second body further comprises a guiding slot, a display surface, and an external surface opposite to the display surface, the guiding slot is disposed in the second body and connected between the display surface and the external surface, the second magnet is disposed in the guiding slot to be moved along the guiding slot.

9. The portable electronic device as recited in claim 1, wherein the second body further comprises a display surface and an external surface opposite to the display surface, the second body is configured to rotate between a closing state and a tablet state and relatively to the first body, the display surface leans on the top surface when the portable electronic device is in the closing state, and the external surface leans on the bottom surface when the portable electronic device is in the tablet state.

10. The portable electronic device as recited in claim 1, wherein the first body further comprises a keyboard module disposed on the top surface.

* * * * *